US008631086B2

(12) United States Patent
Blocksome et al.

(10) Patent No.: US 8,631,086 B2
(45) Date of Patent: Jan. 14, 2014

(54) PREVENTING MESSAGING QUEUE DEADLOCKS IN A DMA ENVIRONMENT

(75) Inventors: Michael A. Blocksome, Rochester, MN (US); Dong Chen, Croton On Hudson, NY (US); Thomas Gooding, Rochester, MN (US); Philip Heidelberger, Cortlandt Manor, NY (US); Jeff Parker, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1068 days.

(21) Appl. No.: 12/241,514

(22) Filed: Sep. 30, 2008

(65) Prior Publication Data

US 2011/0173287 A1 Jul. 14, 2011

(51) Int. Cl.
*G06F 15/167* (2006.01)

(52) U.S. Cl.
USPC .......................................... 709/212; 709/201

(58) Field of Classification Search
USPC .................................................. 709/212, 201
See application file for complete search history.

(56) References Cited

U.S. PATENT DOCUMENTS

| | | | |
|---|---|---|---|
| 5,247,626 A | 9/1993 | Firoozmand | |
| 5,515,371 A * | 5/1996 | Venters | 370/517 |
| 5,758,166 A | 5/1998 | Ajanovic | |
| 6,289,378 B1 | 9/2001 | Meyer et al. | |
| 6,345,294 B1 | 2/2002 | O'Toole et al. | |
| 6,381,650 B1 | 4/2002 | Peacock | |
| 6,490,630 B1 | 12/2002 | Poon et al. | |
| 6,629,145 B1 | 9/2003 | Pham et al. | |
| 6,687,817 B1 | 2/2004 | Paul | |
| 6,912,602 B2 | 6/2005 | Sano et al. | |
| 6,978,294 B1 | 12/2005 | Adams et al. | |
| 7,568,018 B1 | 7/2009 | Hove et al. | |
| 7,793,074 B1 * | 9/2010 | Wentzlaff et al. | 712/10 |
| 8,112,559 B2 | 2/2012 | Blocksome et al. | |
| 2003/0212773 A1 | 11/2003 | Sullivan | |
| 2003/0233576 A1 | 12/2003 | Maufer et al. | |
| 2004/0030762 A1 | 2/2004 | Silverthorne et al. | |
| 2004/0249907 A1 | 12/2004 | Brubacher et al. | |
| 2005/0138179 A1 | 6/2005 | Encarnacion et al. | |
| 2005/0251577 A1 | 11/2005 | Guo et al. | |

(Continued)

OTHER PUBLICATIONS

Blocksome, et al. U.S. Patent Application Entitled, "Increasing Available FIFO Space to Prevent Messaging Queue Deadlocks in a DMA Environment,".

(Continued)

*Primary Examiner* — John Follansbee
*Assistant Examiner* — Glenford Madamba
(74) *Attorney, Agent, or Firm* — Patterson & Sheridan, LLP

(57) ABSTRACT

Embodiments of the invention may be used to manage message queues in a parallel computing environment to prevent message queue deadlock. A direct memory access controller of a compute node may determine when a messaging queue is full. In response, the DMA may generate an interrupt. An interrupt handler may stop the DMA and swap all descriptors from the full messaging queue into a larger queue (or enlarge the original queue). The interrupt handler then restarts the DMA. Alternatively, the interrupt handler stops the DMA, allocates a memory block to hold queue data, and then moves descriptors from the full messaging queue into the allocated memory block. The interrupt handler then restarts the DMA. During a normal messaging advance cycle, a messaging manager attempts to inject the descriptors in the memory block into other messaging queues until the descriptors have all been processed.

19 Claims, 9 Drawing Sheets

(56) References Cited

U.S. PATENT DOCUMENTS

| | | | |
|---|---|---|---|
| 2005/0289254 A1* | 12/2005 | Chien | 710/52 |
| 2006/0059003 A1 | 3/2006 | Requena et al. | |
| 2006/0232819 A1 | 10/2006 | Kasamatsu | |
| 2007/0073960 A1* | 3/2007 | Ogawa et al. | 710/316 |
| 2007/0118742 A1* | 5/2007 | Abhishek et al. | 713/160 |
| 2007/0204156 A1 | 8/2007 | Jeghers | |
| 2007/0286100 A1 | 12/2007 | Saaranen et al. | |
| 2009/0100155 A1 | 4/2009 | Lee | |
| 2011/0010437 A1 | 1/2011 | Christenson et al. | |
| 2011/0087721 A1* | 4/2011 | Huang et al. | 709/201 |

OTHER PUBLICATIONS

"UPnP Device Architecture 1.1", UPnP Forum, Oct. 15, 2008. pp. 1-129.

* cited by examiner

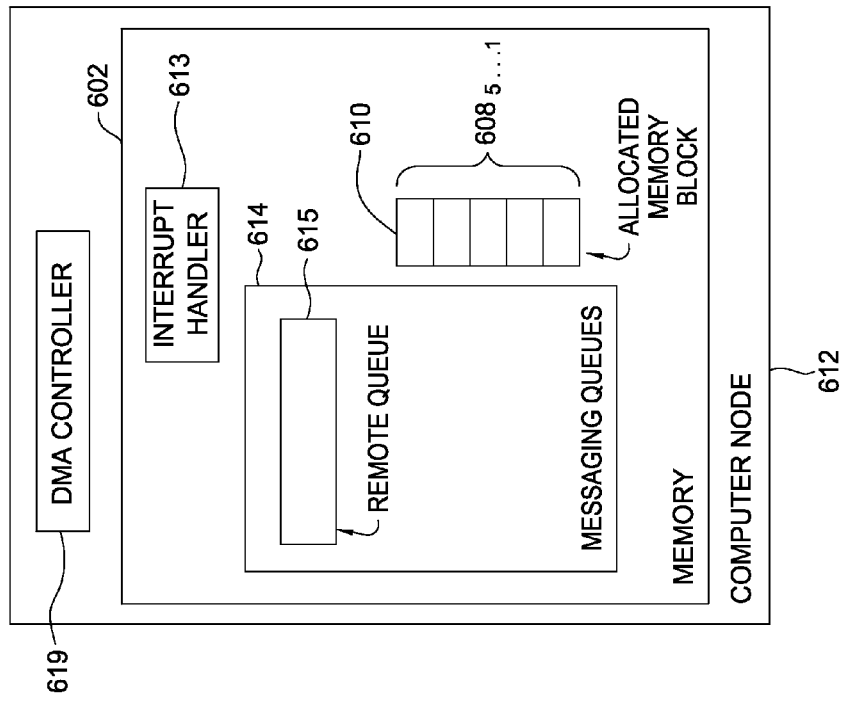
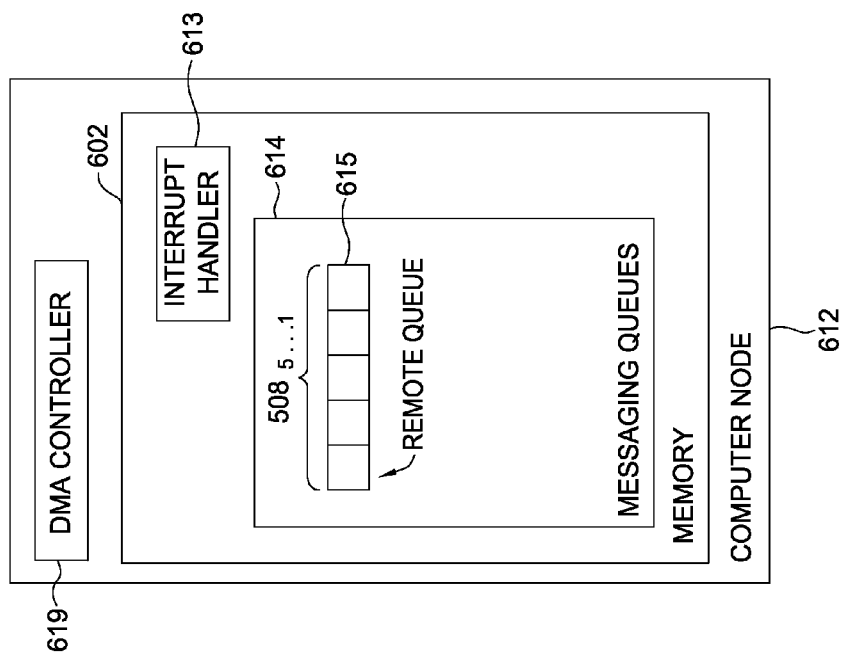

PREVENTING MESSAGING QUEUE DEADLOCKS IN A DMA ENVIRONMENT

STATEMENT REGARDING FEDERALLY SPONSORED RESEARCH OR DEVELOPMENT

This invention was made with Government support under Contract No. B554331 awarded by the Department of Energy. The U.S. Government has certain rights in this invention.

FIELD OF THE INVENTION

The present invention generally relates to data processing and more particularly to a method for resolving messaging queue deadlocks in a parallel computing system with DMA controllers.

SUMMARY OF THE INVENTION

Powerful computers may be designed as highly parallel systems (such as a Blue Gene system) where the processing activity of hundreds, if not thousands, of processors (CPUs) are coordinated to perform computing tasks. For example, one family of parallel computing systems has been (and continues to be) developed by International Business Machines (IBM) under the name Blue Gene®. The Blue Gene/P architecture provides a scalable, parallel computer that may be configured with more than 200,000 compute nodes. Each compute node includes a single application specific integrated circuit (ASIC) with multiple CPUs, memory, and a Direct Memory Access (DMA) engine or controller. Compute nodes in a parallel system typically communicate with one another over multiple communication networks. Various communications protocols (such as Rendezvous and Get) are used to transfer a message from a source node to a target node across some form of network (e.g., a wide area network, local network, or simply a connection between two processors on the same node). For example, the Get protocol sends a "get packet" from a target node to a source node requesting that the source node send a message. The Rendezvous protocol sends a "Request to send" packet from the source node to the target node, and the target node sends a "get packet" back to the source node causing the message to be sent.

These protocols may be implemented on a system having a hardware DMA engine or controller. The DMA may process messages between compute nodes without interrupting the processing core of a source node. For example, the DMA may have a "remote get" feature. A target node sends a "remote get" packet to a source node. The packet contains descriptors which may describe the location and size of the data to be sent from the source node to the target node. The packet also identifies the source node's remote messaging queue, or injection first in first out (FIFO) queue, into which the descriptors are to be injected. The DMA controller on the source node receives this packet and injects the descriptors into the specified injection FIFO. The DMA of the source node then processes the descriptors in the injection FIFO, causing the specified data to be sent to the target node without involving the processors of the source node.

When many nodes each have a DMA in a network using these types of protocols, a source node may become flooded with remote get packets from different target nodes. Normally, an injection FIFO queue specified in a remote get packet has enough room to accept remote get descriptors. However when the injection FIFO becomes full, the DMA cannot inject remote get descriptors into the FIFO. In this case, the DMA stops receiving packets and waits for space to become available in the injection FIFO. A slot in the injection FIFO will become available when the data associated with the descriptor at the head of the FIFO has been sent to a target node. However, the data may not be able to be sent to the target node if the DMA of the target node has stopped receiving packets due to the same problem occurring on the target node.

One embodiment of the invention includes a method for managing message queues in a parallel computing system having a plurality of compute nodes. The method may generally include determining that a first queue, on a first compute node, storing a set of message descriptors has become full, where a direct memory access controller (DMA) is configured to inject message descriptors into the first queue. The method may also include generating an interrupt delivered to an interrupt handler. The interrupt handler may generally be configured to perform the steps of stopping the DMA controller, generating a second queue, wherein the second queue is larger than the first queue, and swapping the first queue with the second queue such that the DMA controller is configured to inject message descriptors into the second queue. The interrupt handler may be further configured to move the set of message descriptors from the first queue to the second queue; and restart the DMA controller.

Another embodiment of the invention includes a computer-readable storage-medium containing a program which, when executed, performs an operation for managing message queues in a parallel computing system having a plurality of compute nodes. The operation may generally include determining that a first queue, on a first compute node, storing a set of message descriptors has become full, where a direct memory access controller (DMA) is configured to inject message descriptors into the first queue. The operation may also include generating an interrupt delivered to an interrupt handler. The interrupt handler may generally be configured to perform the steps of stopping the DMA controller, generating a second queue, wherein the second queue is larger than the first queue, and swapping the first queue with the second queue such that the DMA controller is configured to inject message descriptors into the second queue. The interrupt handler may be further configured to move the set of message descriptors from the first queue to the second queue; and restart the DMA controller.

Still another embodiment of the invention includes a parallel computing system. The system may generally include a plurality of compute nodes, each having at least a processor, a memory and a direct memory access controller (DMA). The plurality of compute nodes may be configured to move messages between two compute nodes of the plurality and the DMA on a first compute node may be configured to determine that a first queue, on the first compute node, storing a set of message descriptors has become full and generate an interrupt delivered to an interrupt handler on the first compute node. The interrupt handler may be generally be configured to perform the steps of stopping the DMA controller, generating a second queue, wherein the second queue is larger than the first queue, and swapping the first queue with the second queue such that the DMA controller is configured to inject message descriptors into the second queue. The interrupt handler may be further configured to move the set of message descriptors from the first queue to the second queue and restart the DMA controller.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

FIG. 6A illustrates an example of a remote messaging queue when full in a compute node of a parallel system, according to one embodiment of the invention.

FIG. 6B illustrates an example of a remote messaging queue in a compute node of a parallel system that is being emptied and queue data being placed in an allocated memory block, according to one embodiment of the invention.

DETAILED DESCRIPTION OF THE PREFERRED EMBODIMENTS

Figure 1:
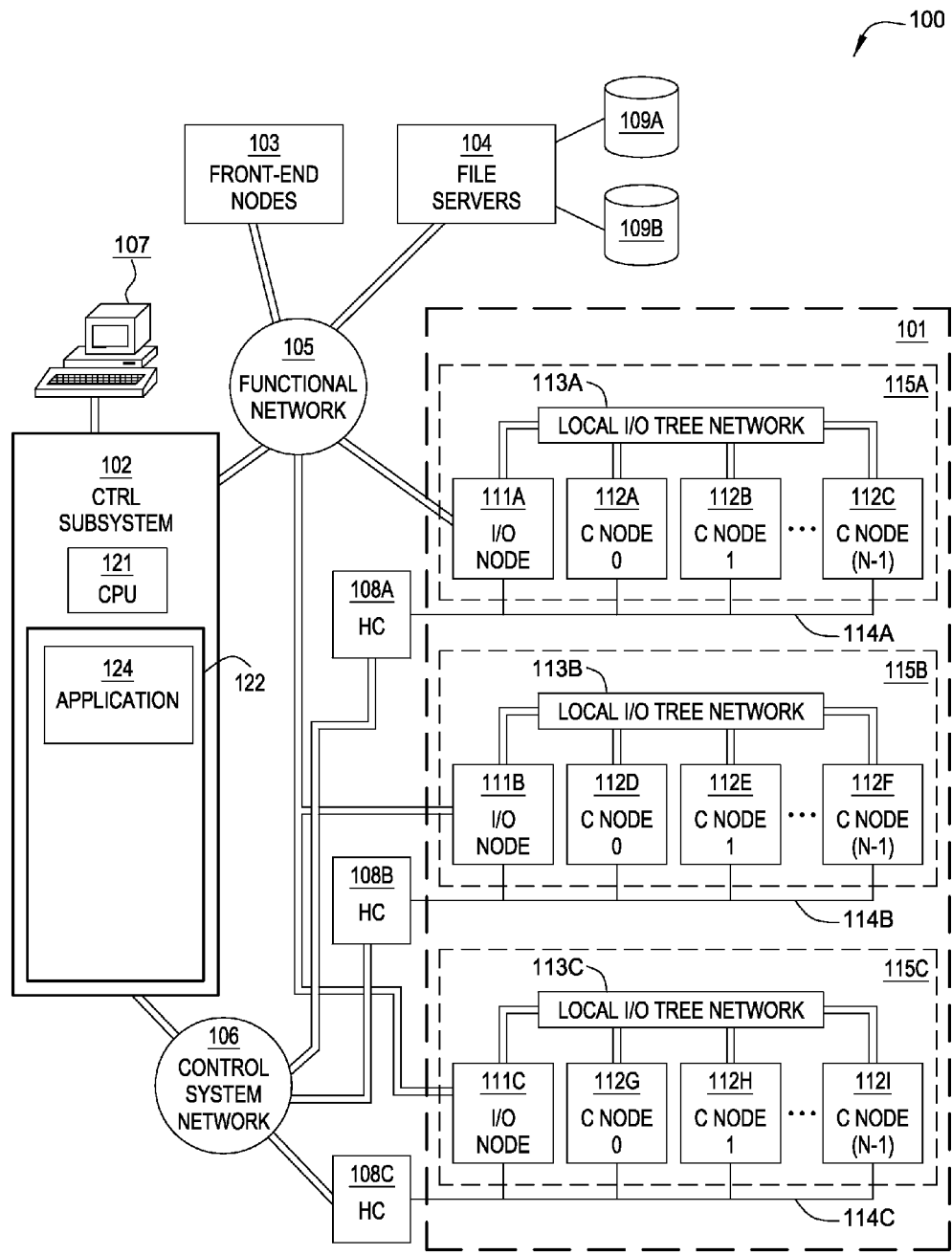
FIG. 1 is a high-level block diagram of components of a massively parallel computer system, according to one embodiment of the present invention.

Distributed systems, such as a Blue Gene® system, provide tremendous computing power by coordinating the activity of thousands of processors. Such coordination may require a node to process many messaging packets. Each node, however, may have limited resources, including limited memory. Therefore, the size of messaging queues may be inadequate for all messaging packets received and, as such, queues may become full, creating possible deadlock situations.

Embodiments of the invention provide a method for resolving messaging queue deadlocks in a parallel computing system with Direct Memory Access controllers (DMAs). In one embodiment, a DMA determines when a messaging queue, or injection FIFO queue, is full. In response, the DMA fires an interrupt on all processors of a node with a full messaging queue. All processors on that node may handle the interrupt. Alternatively, the first processor to see the interrupt may handle the interrupt, while the other processors ignore the interrupt. If the first processor is not responsible for the full queue, then the interrupt will fire again. That is, if the full queue is not owned by the first processor then the interrupt handler for the first processor will quit and a new interrupt will fire immediately. The new interrupt is likely to be seen first by a second processor, which handles it. This process continues until the processor causing the interrupt is the first to see it and handles the interrupt. In one embodiment, an interrupt handler may be configured to stop the DMA, create a new, larger messaging queue and then copy all descriptors from the full messaging queue into the new, larger queue. The interrupt handler may be configured to free the old messaging queue for reuse. The interrupt handler may be configured to then restart the DMA.

In an alternative embodiment, an interrupt handler may be configured to stop the DMA, allocate a memory block to hold the messaging queue data, and then move all descriptors from the full messaging queue into the allocated memory block, leaving the messaging queue empty. The interrupt handler may be configured to then restart the DMA. During the normal messaging advance cycle, a messaging manager may attempt to inject the descriptors in the memory block into other messaging queues until the descriptors have all been processed. The allocated memory block is freed when all descriptors in the memory block are injected.

In the following, reference is made to embodiments of the invention. However, it should be understood that the invention is not limited to any specifically described embodiment. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

One embodiment of the invention is implemented as a program product for use with a computer system. The program(s) of the program product defines functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive) on which information is permanently stored; (ii) writable storage media (e.g., floppy disks within a diskette drive or hard-disk drive) on which alterable information is stored. Such computer-readable storage media, when carrying computer-readable instructions that direct the functions of the present invention, are embodiments of the present invention. Other media include communications media through which information is conveyed to a computer, such as through a computer or telephone network, including wireless communications networks. The latter embodiment specifically includes transmitting information to/from the Internet and other networks. Such communications media, when carrying computer-readable instructions that direct the functions of the present invention, are embodiments of the present invention. Broadly, computer-readable storage media and communications media may be referred to herein as computer-readable media.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

FIG. 1 is a high-level block diagram of components of a massively parallel computer system 100, according to one embodiment of the present invention. Illustratively, computer system 100 shows the high-level architecture of an IBM Blue Gene® computer system, it being understood that other parallel computer systems could be used, and the description of a preferred embodiment herein is not intended to limit the present invention.

As shown, computer system 100 includes a compute core 101 having a plurality of compute nodes 112 arranged in a regular array or matrix. Compute nodes 112 perform the useful work performed by system 100. The operation of computer system 100, including compute core 101, may be controlled by service node 102. Various additional processors in front-end nodes 103 may perform auxiliary data processing functions, and file servers 104 provide an interface to data storage devices such as disk based storage 109A, 109B or other I/O (not shown). Functional network 105 provides the primary data communication path among compute core 101 and other system components. For example, data stored in storage devices attached to file servers 104 is loaded and stored to other system components through functional network 105.

Also as shown, compute core 101 includes I/O nodes 111A-C and compute nodes 112A-I. Compute nodes 112 provide the processing capacity of parallel system 100, and are configured to execute applications written for parallel processing. I/O nodes 111 handle I/O operations on behalf of compute nodes 112. For example, the I/O node 111 may retrieve data from file servers 104 requested by one of compute nodes 112. Each I/O node 111 may include a processor and interface hardware that handles I/O operations for a set of N compute nodes 112, the I/O node and its respective set of N compute nodes are referred to as a Pset. Compute core 101 contains M Psets 115A-C, each including a single I/O node 111 and N compute nodes 112, for a total of M×N compute nodes 112. The product M×N can be very large. For example, in one implementation M=1024 (1K) and N=64, for a total of 64K compute nodes.

In general, application programming code and other data input required by compute core 101 to execute user applications, as well as data output produced by the compute core 101, is communicated over functional network 105. The compute nodes within a Pset 115 communicate with the corresponding I/O node over a corresponding local I/O collective network 113A-C. The I/O nodes, in turn, are connected to functional network 105, over which they communicate with I/O devices attached to file servers 104, or with other system components. Thus, the local I/O collective networks 113 may be viewed logically as extensions of functional network 105, and like functional network 105, are used for data I/O, although they are physically separated from functional network 105.

Control subsystem 102 (also referred to as service node 102) communicates control and state information with the nodes of compute core 101 over control system network 106. Network 106 is coupled to a set of hardware controllers 108A-C. Each hardware controller communicates with the nodes of a respective Pset 115 over a corresponding local hardware control network 114A-C. The hardware controllers 108 and local hardware control networks 114 are logically an extension of control system network 106, although physically separate.

Service node 102 may be configured to direct the operation of the compute nodes 112 in compute core 101. In one embodiment, service node 102 is a computer system that includes a processor (or processors) 121 and internal memory 122. An attached console 107 (i.e., a keyboard, mouse, and display) may be used by a system administrator or similar person to initialize computing jobs on compute core 101. Service node 102 may also include an internal database which maintains state information for the compute nodes in core 101, and an application 124 which may be configured to, among other things, control the allocation of hardware in compute core 101, direct the loading of data on I/O nodes 111, migrate a process running on one of compute nodes 112 to another one of compute nodes 112, and perform diagnostic and maintenance functions.

In one embodiment, service node 102 communicates control and state information with the nodes of compute core 101 over control system network 106. Network 106 is coupled to a set of hardware controllers 108A-C. Each hardware controller communicates with the nodes of a respective Pset 115 over a corresponding local hardware control network 114A-C. The hardware controllers 108 and local hardware control networks 114 are logically an extension of control system network 106, although physically separate. In one embodiment, control system network 106 may include a JTAG (Joint Test Action Group) network, configured to provide a hardware monitoring facility. As is known, JTAG is a standard for providing external test access to integrated circuits serially, via a four- or five-pin external interface. The JTAG standard has been adopted as an IEEE standard. Within a Blue Gene system, the JTAG network may be used to send performance counter data to service node 102 in real-time. That is, while an application is running on compute core 101, performance data may be gathered and transmitted to service node 102 without affecting the performance of that application.

In addition to service node 102, front-end nodes 103 provide computer systems used to perform auxiliary functions which, for efficiency or otherwise, are best performed outside compute core 101. Functions which involve substantial I/O operations are generally performed in the front-end nodes 103. For example, interactive data input, application code editing, or other user interface functions are generally handled by front-end nodes 103, as is application code compilation. Front-end nodes 103 are also connected to functional network 105 and may communicate with file servers 104.

Figure 2:
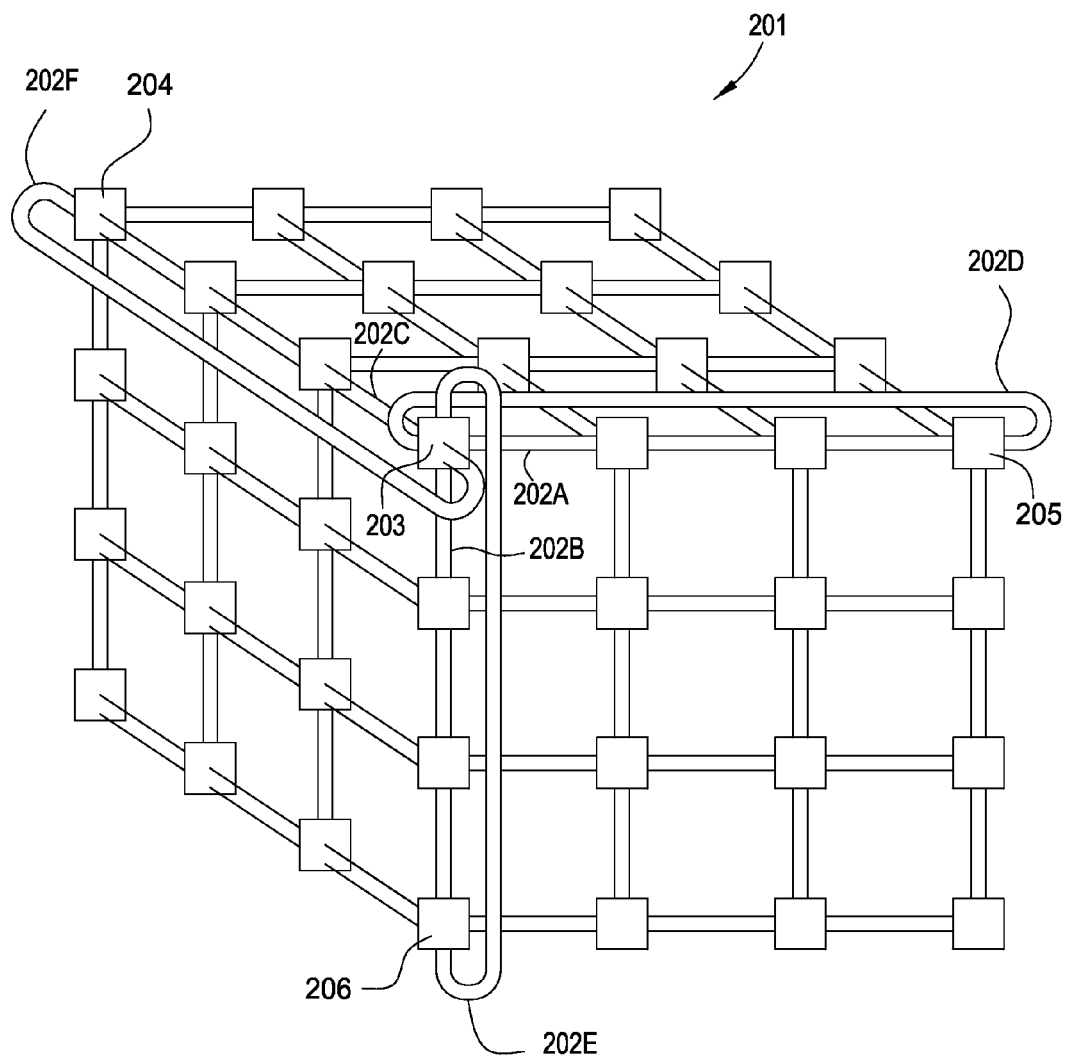
FIG. 2 illustrates an example of a three dimensional torus network of the system of FIG. 1, according to one embodiment of the invention.

As stated, in a massively parallel computer system 100, compute nodes 112 may be logically arranged in a multi-dimensional torus. In the case of a three-dimensional torus, each compute node 112 may be identified using an x, y and z coordinate. FIG. 2 is a conceptual illustration of a three-dimensional torus network of system 100, according to one embodiment of the invention. More specifically, FIG. 2 illustrates a 4×4×4 torus 201 of compute nodes, in which the interior nodes are omitted for clarity. Although FIG. 2 shows a 4×4×4 torus having 64 nodes, it will be understood that the actual number of compute nodes in a parallel computing system is typically much larger. For example, a complete Blue Gene/L system includes 65,536 compute nodes. Each compute node 112 in torus 201 includes a set of six node-to-node communication links 202A-F which allows each compute node in torus 201 to communicate with its six immediate neighbors, two nodes in each of the x, y and z coordinate dimensions.

As used herein, the term "torus" includes any regular pattern of nodes and inter-nodal data communications paths in more than one dimension, such that each node has a defined set of neighbors, and for any given node, it is possible to determine the set of neighbors of that node. A "neighbor" of a given node is any node which is linked to the given node by a direct inter-nodal data communications path. That is, a path which does not have to traverse another node. The compute nodes may be linked in a three-dimensional torus 201, as shown in FIG. 2, but may also be configured to have more or fewer dimensions. Also, it is not necessarily the case that a given node's neighbors are the physically closest nodes to the given node, although it is generally desirable to arrange the nodes in such a manner, insofar as possible.

In one embodiment, the compute nodes in any one of the x, y, or z dimensions form a torus in that dimension because the point-to-point communication links logically wrap around. For example, this is represented in FIG. 2 by links 202D, 202E, and 202F which wrap around from compute node 203 to the other end of compute core 201 in each of the x, y and z dimensions. Thus, although node 203 appears to be at a "corner" of the torus, node-to-node links 202A-F link node 203 to nodes 204, 205, and 206, in the x, y, and z dimensions of torus 201.

Figure 3:
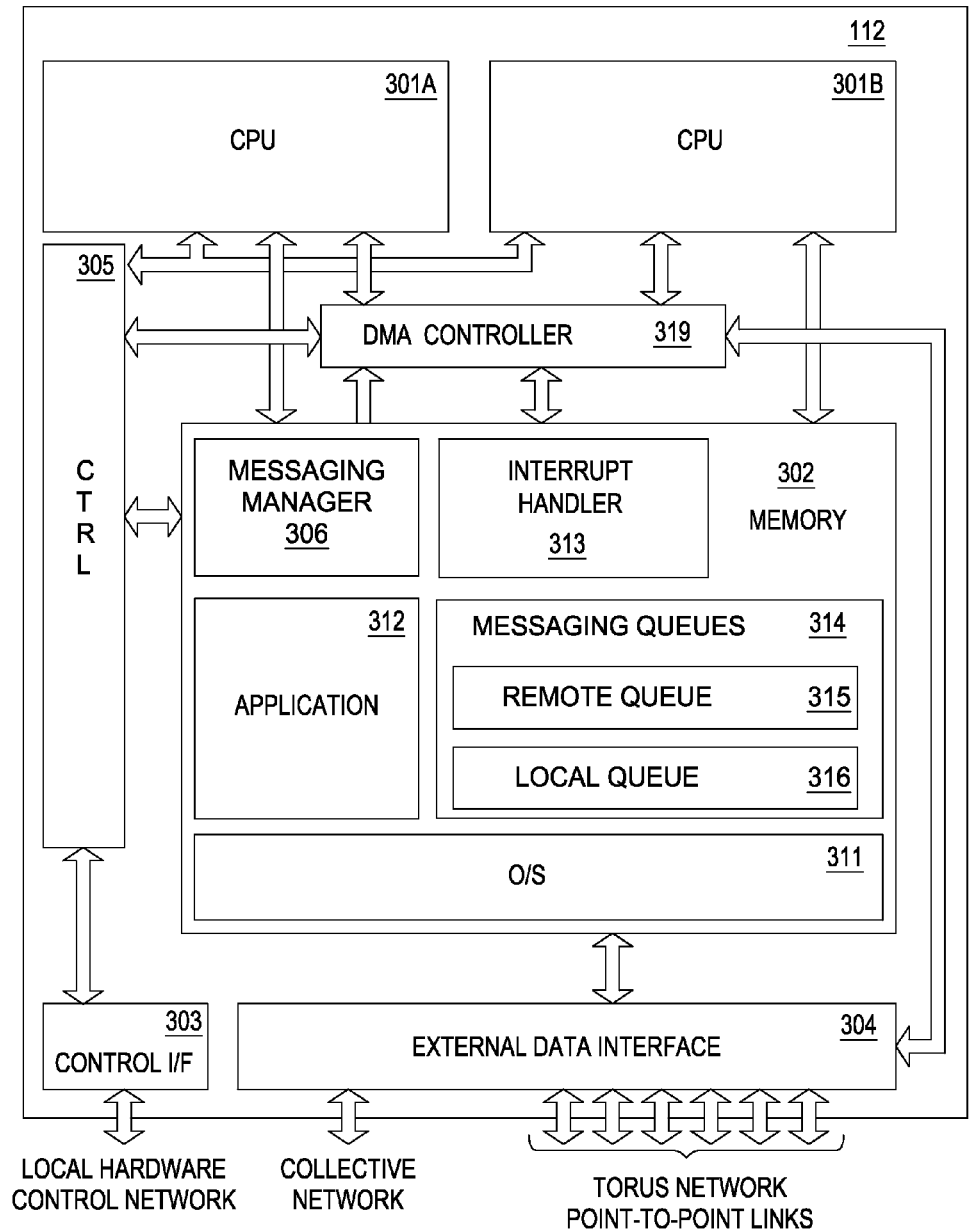
FIG. 3 is a diagram illustrating an example of a compute node of a parallel computing system, according to one embodiment of the invention.

FIG. 3 is a diagram illustrating an example of a compute node 112 of a parallel computing system, according to one embodiment of the invention. Specifically, the compute node shown in FIG. 3 is representative of a simplified compute node on a Blue Gene®/P computer system. Of course, embodiments of the invention may be implemented for use with other distributed architectures, grids or clusters. Illustratively, compute node 112 includes processor cores 301A and 301B. As one ordinarily skilled in the art will appreciate, a compute node may include one or more processor cores. For example, a typical Blue Gene/P compute node has four processor cores. Compute node 112 also includes memory 302 used by processor cores 301; an external control interface 303 which is coupled to local hardware control network 114 (e.g., control system network 106); an external data communications interface 304 which is coupled to the corresponding local I/O collective network 113 (e.g., functional network 105) and the corresponding six node-to-node links 202 of the torus network 201; a DMA controller 319 (or just DMA 319) which interfaces with the torus network 201 through the external data interface 304; and includes monitoring and control logic 305 which receives and responds to control commands received through external control interface 303. Monitoring and control logic 305 may access processor cores 301, DMA controller 319, and locations in memory 302 on behalf of service node 102 to read (or in some cases alter) the operational state of node 112. In one embodiment, each compute node 112 may be physically implemented as a single integrated circuit.

As described, functional network 105 may service many I/O nodes 111, and each I/O node 111 is shared by a group of compute nodes 112 (i.e., a Pset). Thus, it is apparent that the I/O resources of parallel system 100 are relatively sparse when compared to computing resources. Although it is a general purpose computing machine, parallel system 100 is designed for maximum efficiency in applications which are computationally intense.

As shown in FIG. 3, memory 302 stores an operating system image 311, an application 312, a messaging manager 306, messaging queues 314, and an interrupt handler 313 as required. Operating system image 311 provides a copy of a simplified-function operating system running on compute node 112. Operating system image 311 may include a minimal set of functions required to support operation of the compute node 112.

Application code image 312 represents a copy of the application code being executed by compute node 112. Application code image 312 may include a copy of a computer program submitted for execution on system 100 (e.g., by service node 102 and application 124). In one embodiment, a group of compute nodes may be assigned to a block, where each node in the block executes the same application code image 312. The application image on each node may be configured to communicate with the other nodes of that block in performing the computing job. For example, many computing tasks may be performed in parallel, and each node of the block participates in performing a collective task. Using parallel processing techniques to run on a block of hundreds, thousands, or even tens of thousands of compute nodes allows otherwise intractable computing tasks to be performed within a reasonable time.

As part of executing a job, application 312 may be configured to transmit messages from compute node 112 to other compute nodes assigned to a given block. For example, the high level MPI call of MPI_Send( ) may be used by application 312 to transmit a message from one compute node to another. On the other side of the communication, the receiving node may use the MPI call MPI_Receive( ) to receive and process the message. In a Blue Gene® system, the external data interface 304 may be configured to transmit the high level MPI message by encapsulating it within a set of packets and transmitting the packets of over the torus network of point-to-point links. Other parallel systems may provide mechanisms for transmitting messages between different compute nodes. For example, nodes in a Beowulf cluster may communicate using a using a high-speed Ethernet style network. Similarly, large distributed or grid-type systems use message passing techniques to coordinate the processing activity of a block of compute nodes.

The DMA controller 319 may be configured to handle message processing between compute nodes. In contrast, a parallel computing system without a DMA 319 (e.g., a Blue Gene/L system) relies on the processors for injecting and receiving messaging packets into and from a network. In a Blue Gene/P system, the DMA 319 may be configured to handle messaging packets received by the external data interface 304 over the torus network 201. The DMA 319 may be configured to send messages to other nodes or itself using the external data interface 304. The DMA 319 may use messaging buffers or queues for holding and processing such messages. For example, the Blue Gene/P system uses injection and reception memory FIFO (first-in, first-out) queues for each processor on a node. The injection FIFO queues are for data that is to be processed and placed into the network. The reception memory FIFO queues are for data that is to be consumed or used by the node.

The DMA 319 may be configured to send and process different message types. For example, the DMA 319 of a Blue Gene/P system uses memory FIFO, direct put, and remote get message types. Each message or packet may contain descriptors which include the location and size of the data to be sent from the source node to the target node. The packet may also identify DMA resources needed including the queue into which the descriptors are to be added. For example, the DMA 319 of a Blue Gene/P system has a remote get feature that allows the DMA 319 to request some information from a DMA 319 of another node. A DMA 319 of a target node sends a "remote get" packet to a DMA 319 of a source node. The DMA 319 of the source node receives this packet and adds the descriptors into the specified injection FIFO queue. The DMA 319 of the source node then processes the descriptors in the injection FIFO queue, causing the specified data to be sent to the target node without the processors of the source node scheduling or performing the transfer.

Illustratively, messaging queues 314 includes remote messaging queue 315 and local messaging queue 315. Remote messaging queue 315 represents an injection FIFO queue of a given processor for descriptors from remote get packets. Normal or local messaging queue 315 represents one or more injection queues of a given processor for information from non-remote get packets. That is, local queue 315 represents injection queues that do not typically store descriptors from remote get packets. Further, local queues typically have descriptors being injected by the processors and not the DMA. Interrupt handler 313 represents a software component that handles interrupts initiated by the DMA 319 (e.g., initiated when a messaging queue on a given processor becomes full).

Figure 4:
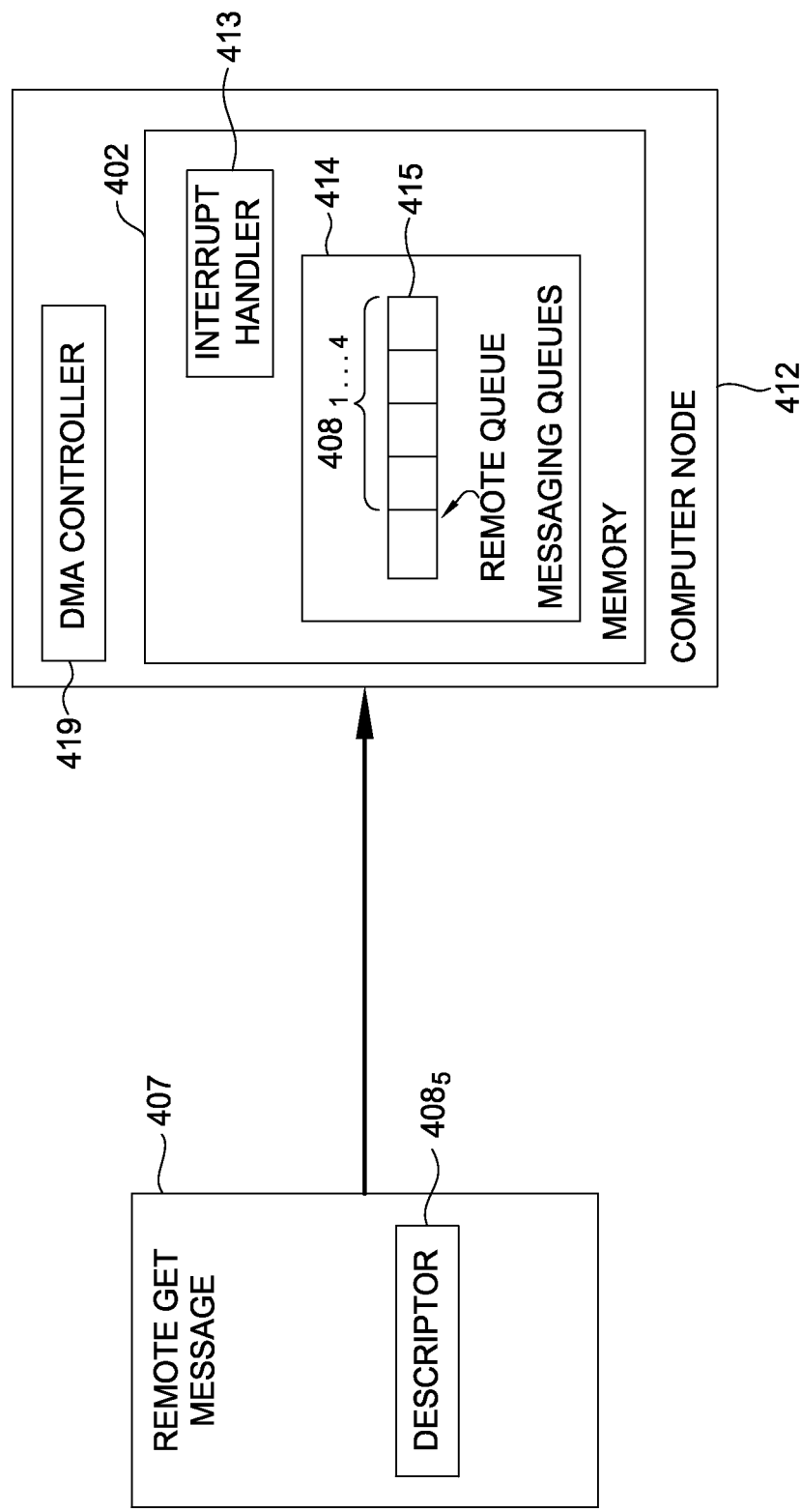
FIG. 4 illustrates an example of a remote get packet being received by a compute node, according to one embodiment of the invention.

FIG. 4 illustrates an example of a remote get packet being received by a compute node, according to one embodiment of the invention. As shown, FIG. 4 includes a remote get message 407 representing a remote get packet sent from a target node requesting some information to be sent. Illustratively, FIG. 4 also includes a compute node 412 as recipient of message 407. Remote get packet 407 includes a descriptor $408_5$. Descriptor $408_5$ represents information about the packet 407, including what information is requested from the target node and which queue the descriptor is to be placed. As one of ordinary skill in the art will appreciate the compute node 412 is illustrated in a greatly simplified form so as to highlight the invention. As shown, compute node 412 includes a DMA controller 419 and a memory 402.

Illustratively, memory 402 includes messaging queues 414 and an interrupt handler 413. As shown, messaging queues 414 includes a remote messaging queue 415. The remote queue 415 includes descriptors $408_{1-4}$ waiting to be processed. As stated, the DMA 419 may process the message 407. In one embodiment, the DMA removes the descriptor $408_5$ from the message 407 and places the descriptor $408_5$ in the remote queue 415. If the remote queue 415 is full, the DMA 419 may fire an interrupt cleared by the interrupt handler 413.

Figure 5B:
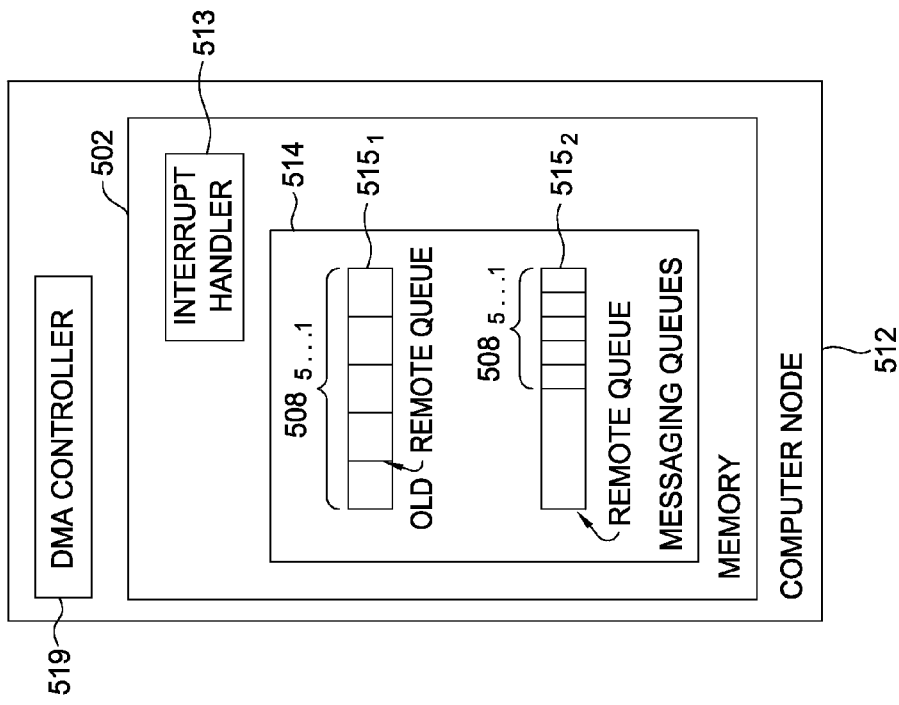
FIG. 5B illustrates an example of a remote messaging queue in a compute node of a parallel system that is being copied and swapped into a new larger remote messaging queue, according to one embodiment of the invention.
Figure 5A:
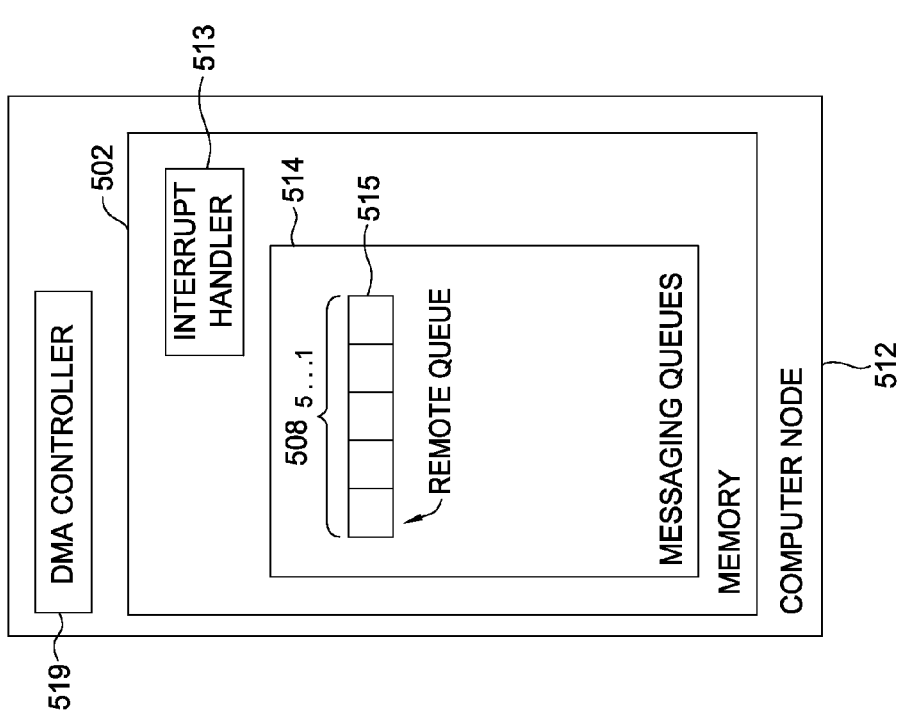
FIG. 5A illustrates an example of a remote messaging queue when full in a compute node of a parallel system, according to one embodiment of the invention.

FIG. 5A illustrates an example of a full remote messaging queue in a compute node of a parallel system, according to one embodiment of the invention. Illustratively, compute node 512 includes a remote queue 515 that has become full with descriptors $508_{1-5}$. The DMA 519 may be configured to detect when remote queue 515 has become full. The DMA 519 may fire an interrupt to each processor of node 512 when the last available space in the remote queue 515 is used. Alternatively, the DMA 519 may fire an interrupt to each processor of node 512 when the DMA 519 tries to add a new descriptor 508 to a full remote queue 515. In one embodiment, each processor of compute node 512 handles the interrupt. Alternatively, the first processor seeing the interrupt may handle the interrupt, while the other processors ignore the interrupt. If the first processor is not the cause of the interrupt then the interrupt fires again. That is, if the full remote queue is not owned by the first processor then interrupt handler 513 for the first processor quits and a new interrupt fires immediately. The new interrupt is caught and handled by a different processor of compute node 512. This process continues until the processor that caused the interrupt handles it. Interrupt handler 513 represents a software component that may handle interrupts for a given processor initiated by the DMA 519.

FIG. 5B illustrates an example of a remote messaging queue in a compute node of a parallel system, according to one embodiment of the invention. Illustratively, the remote queue $515_1$ is being copied and swapped into a new, larger remote messaging queue $515_2$. In this example, the interrupt handler 513 is running after being initiated by an interrupt fired by the DMA 519 when the remote queue $515_1$ became filled. In one embodiment, an interrupt handler 513 stops the DMA 519 from processing any more packets destined for the full remote queue $515_1$. Further, the interrupt handler 513 may create a new remote messaging queue $515_2$ that is larger than the current remote queue $515_1$. For example, the interrupt handler 513 may create a new remote queue $515_2$ that can hold twice the number of descriptors 508 as the current queue $515_1$. The interrupt handler 513 may then copy the descriptors $508_{1-5}$ in the full remote queue $515_1$ to the new larger queue $515_2$. After all the descriptors $508_{1-5}$ have been copied to the new remote queue $515_2$, the interrupt handler 513 may allow the old remote queue $515_1$ to be freed and reused by memory 502. The interrupt handler 513 may swap-in the new remote queue $515_2$ such that it becomes the remote queue that is used by the DMA 519. That is, the interrupt handler 513 changes memory pointers that the DMA 519 uses to locate the remote queue to point to the new remote queue $515_2$. The interrupt handler 513 may restart the DMA 519 and continuing processing packets destined for the new larger remote queue $515_2$.

In another embodiment, the DMA 519 or interrupt handler 513 may know or access information about memory 502. In particular, the DMA 519 may know information about physically contiguous memory surrounding the full remote queue $515_1$. If the surrounding contiguous memory is available, the DMA 519 may enlarge the current remote queue $515_1$ by adjusting relevant pointers of the remote queue. The enlargement of the current remote queue $515_1$ would not require a swapping of information to a new larger remote queue and hence may be more efficient in some situations, such as when the DMA 519 or interrupt handler 513 knows information about surrounding contiguous memory.

Further, in one embodiment, the DMA 519 may be configured to fire an interrupt if a queue size is too large. Such an interrupt may be useful when memory 502 is constrained and the remote queue size is inefficient. One ordinarily skilled in the art will appreciate that there are many ways to determine when a queue is too large. For example, the DMA 519 may set a timer for how long a new larger remote queue $515_2$ should be used before reverting back to a smaller queue $515_1$. Another example involves the use of packet counters, in which message packets are counted over a defined period of time and if the number of packets reaches a certain watermark (e.g., a low line or cutoff number) then the remote queue size is reduced. The DMA 519 may use either method listed above (e.g., creating a new smaller queue and copying the data from the current queue into it or shrinking the current queue by changing pointers if appropriate information is known about surrounding memory) to reduce the remote queue size.

FIG. 6A illustrates an example of a full remote messaging queue in a compute node of a parallel system, according to one embodiment of the invention. Illustratively, compute node 612 includes a remote queue 615 that has become full with descriptors $608_{1-5}$. The DMA 619 may be configured to detect when remote queue 615 has become full. The DMA 619 may fire an interrupt to each processor of node 612 when the last available space in the remote queue 615 is used. Alternatively, the DMA 619 may fire an interrupt to each processor of node 612 when the DMA 619 tries to add a new descriptor 608 to a full remote queue 615. In one embodiment, each processor of compute node 612 handles the interrupt. Alternatively, the first processor seeing the interrupt may handle the interrupt, while the other processors ignore the interrupt. If the first processor is not the cause of the interrupt then the interrupt fires again. That is, if the full remote queue is not owned by the first processor then the interrupt handler 613 for the first processor quits and a new interrupt fires immediately. The new interrupt is caught and handled by a different processor of compute node 612. This process continues until the processor that caused the interrupt handles it. Interrupt handler 613 represents a software component that may handle interrupts for a given processor initiated by the DMA 619.

FIG. 6B illustrates an example of a remote messaging queue in a compute node of a parallel system, according to one embodiment of the invention. Illustratively, the remote queue 615 is being emptied and descriptors $608_{1-5}$ being placed in an allocated memory block 610. In this example, the interrupt handler 613 is running after being initiated by an interrupt fired by the DMA 619 when the remote queue 615 became filled. In one embodiment, an interrupt handler 613 stops the DMA 619 from processing any more packets destined for the full remote queue 615. Further, the interrupt handler 613 may allocate a portion or block 610 of memory 602 capable of holding the data (e.g., the descriptors $508_{1-5}$) in the remote messaging queue 515. The interrupt handler 613 may then copy the descriptors $608_{1-5}$ in the full remote queue 615 to the memory block 610, thereby leaving the remote queue 615 empty. The interrupt handler 613 may restart the DMA 619 and continue processing packets destined for the emptied remote queue 615. In one embodiment, the interrupt handler 613 may inform the compute node 612 of the existence and location of a memory block 610 of some descriptors $608_{1-5}$ to be processed. The compute node 612 may remove descriptors $608_{1-5}$ from memory block 610 and inject them into local queues. After all the descriptors $608_{1-5}$ have been injected, the compute node 612 may allow the memory block 610 to be freed and reused by memory 602.

Figure 7:
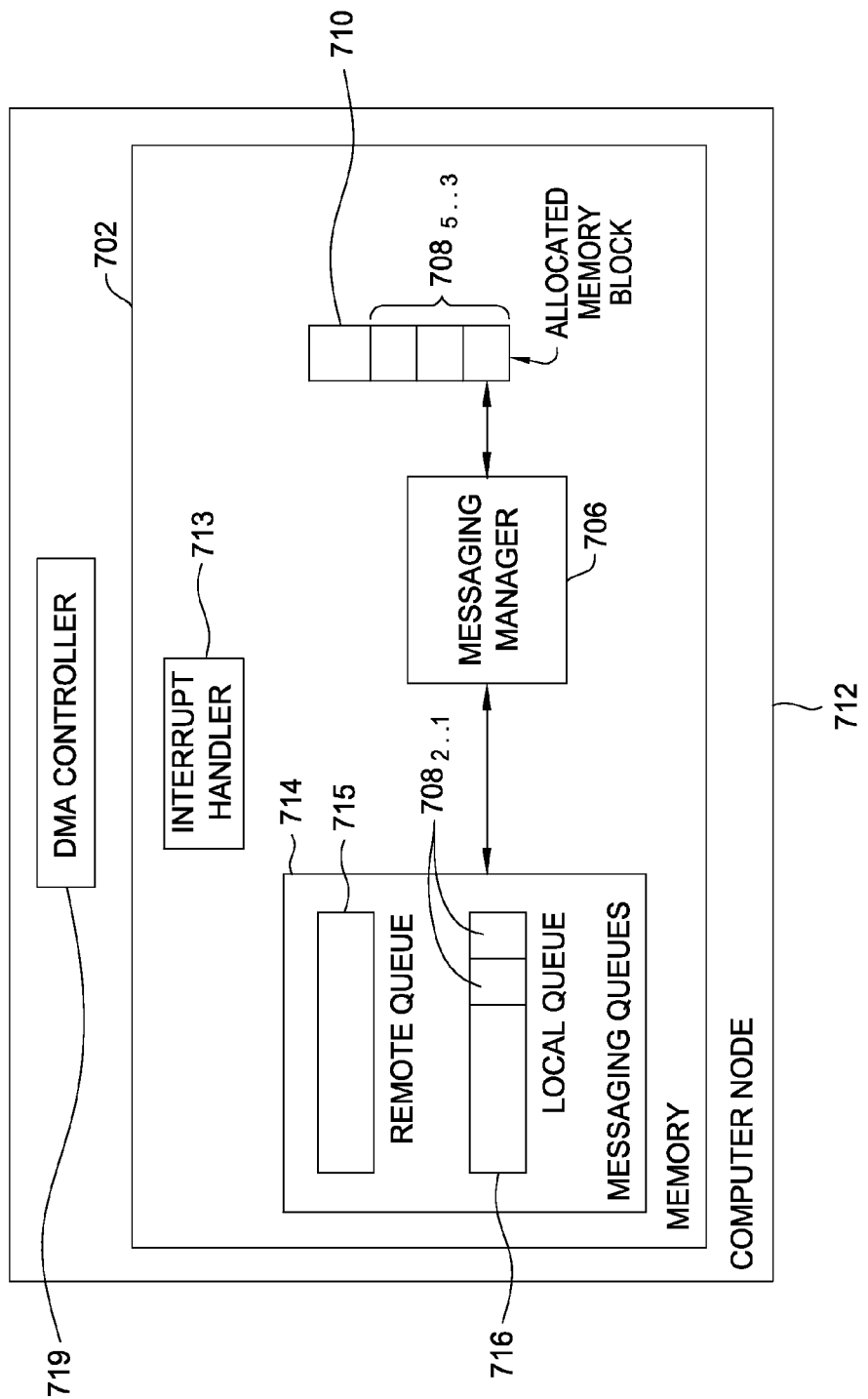
FIG. 7 illustrates an example of a messaging manager injecting descriptors from a memory block into a local messaging queue, according to one embodiment of the invention.

FIG. 7 illustrates an example of a messaging manager injecting descriptors from a memory block into a local messaging queue, according to a second embodiment of the invention. As shown, compute node 712 includes an interrupt handler 713 having been called and stored descriptors $708_{3-5}$ being added or injected into a local remote queue 716. As one of ordinary skill in the art will appreciate, the compute node 712 is shown in a greatly simplified form so as to highlight the invention. Compute node 712 includes a DMA controller 719 and a memory 702.

Illustratively, memory 702 includes messaging queues 714, an interrupt handler 713, and a messaging manager 706. As shown, messaging queues 714 includes a remote messaging queue 715 and local messaging queue 716. The local queue 716 includes descriptors $708_{1-2}$ waiting to be processed. As stated, normal or local messaging queue 716 represents one or more injection queues of a given processor typically for information from non-remote get packets. Further, a local queue may require the use of processing cycles to inject and process descriptors 708. That is, local queue 716 represents injection queues that do not typically store the descriptors 708 from remote get packets and require the processors to inject such descriptors 708. Descriptors $708_{1-2}$ represents descriptors 708 from remote get packets that had been stored in allocated memory block 710 before being added to local queue 716.

As shown, in a second embodiment, the interrupt handler 713 may inform a messaging manager 706, or some other software component, of the existence and location of a memory block 710 of some descriptors $708_{3-5}$ to be processed. The messaging manager 706 may be configured to add or inject descriptors $708_{3-5}$ from memory block 710 into a local queue 716 for processing. That is, normally, descriptors 708 from remote get packets are only processed in a remote messaging queue 715 but if the messaging manager 706 is informed of a memory block 710 of descriptors $708_{3-5}$ waiting to be processed, then the messaging manager 706 may inject these stored descriptors $708_{3-5}$ into local queue 716. In one embodiment, the messaging manager 706 may inject these stored descriptors $708_{3-5}$ during normal messaging advance cycle. That is, when the messaging manager 706 is granted access to a processor, the messaging manager 706 may include these stored descriptors $708_{3-5}$ along with its typical messaging tasks (e.g., advancing descriptors of local queue 716) for processing. The messaging manager 706, or another software component, may free the allocated memory block 710 after all stored descriptors $708_{3-5}$ have been injected into local queue 716.

Figure 8:
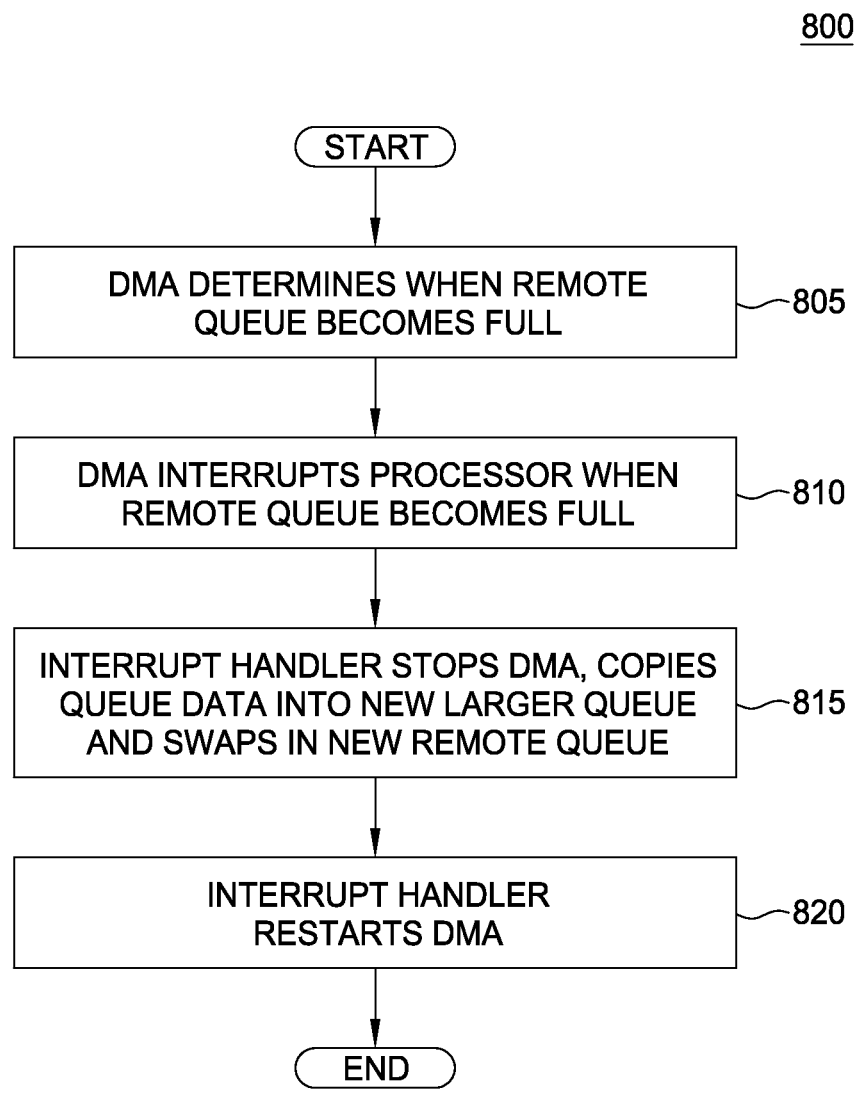
FIG. 8 is a flow diagram illustrating a method for a DMA to enlarge a remote messaging queue in a compute node of a parallel system, according to one embodiment of the invention.

FIG. 8 is a flow diagram 800 illustrating a method for a DMA to enlarge a remote messaging queue in a compute node of a parallel system, according to one embodiment of the invention. As shown the method 800 begins at step 805 where, the DMA determines that a remote queue has become full. At step 810, the DMA fires an interrupt to a processor of the remote queue. At step 815, an interrupt handler for the interrupt generated at step 810 stops the DMA from receiving new packets destined for the full queue, creates a new, larger queue, copies all queue data from the full queue to the new queue, and swaps in the new queue. The DMA may free or deallocate the old queue for reuse by the node. At step 820, the interrupt handler restarts the DMA.

Figure 9:
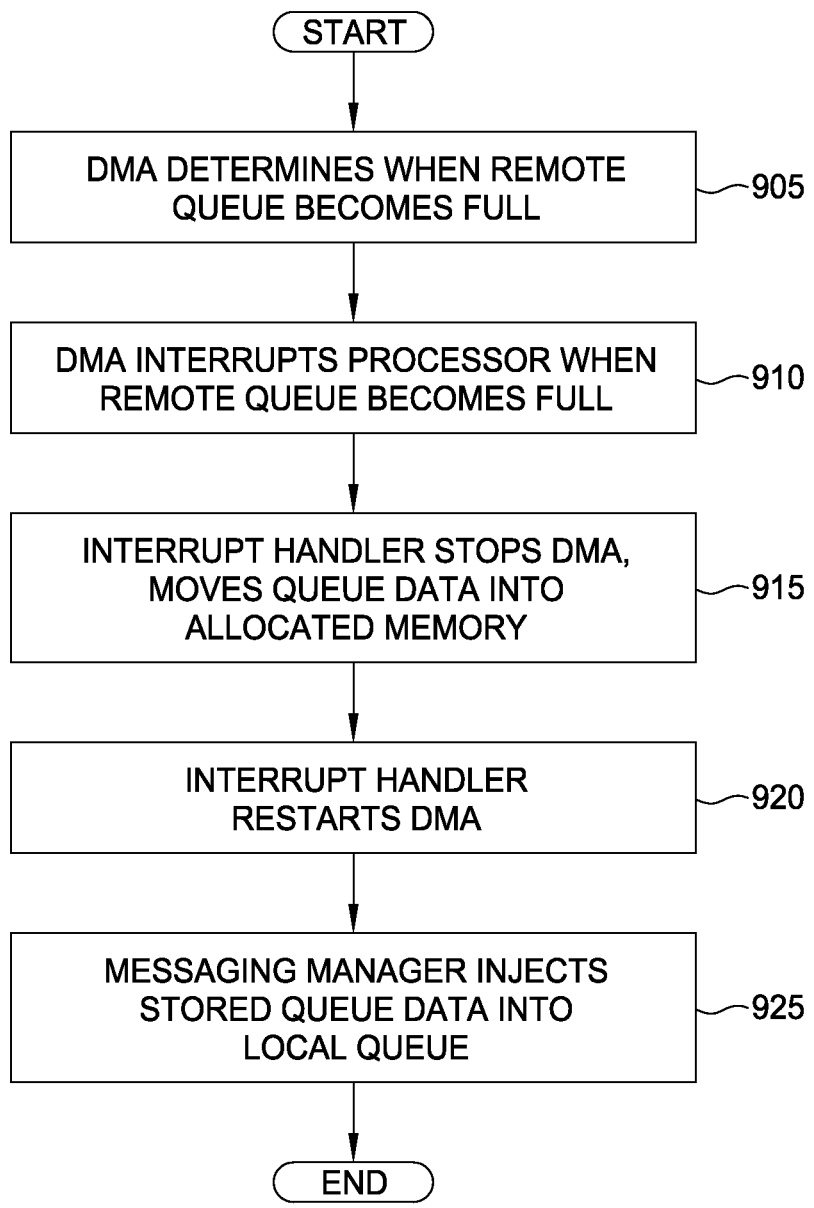
FIG. 9 is a flow diagram illustrating a method for a DMA to make space in a remote messaging queue in a compute node of a parallel system, according to one embodiment of the invention.

FIG. 9 is a flow diagram 900 illustrating a method for a DMA to make space available in a remote messaging queue in a compute node of a parallel system, according to one embodiment of the invention. As shown the method 900 begins at step 905 where, the DMA determines that a remote queue has become full. At step 910, the DMA fires an interrupt to a processor of the remote queue. At step 915, an interrupt handler for the interrupt generated at step 910 stops the DMA from receiving new packets destined for the full queue and moves all queue data from the full queue to an allocated memory block, leaving the queue empty. At step 920, the interrupt handler restarts the DMA. At step 925, a messaging manager, or other software component, injects the stored queue data or descriptors into local queues. In one embodiment, the messaging manager may inject these stored descriptors during the normal messaging advance cycle. That is, when the messaging manager is granted access to a processor, the messaging manager may include these stored descriptors along with its typical messaging tasks (e.g., advancing descriptors of local queue 716) for processing. After all queue data in the memory block has been processed, the DMA, or another software component, may free or deallocate the memory block for reuse by the node.

While the foregoing is directed to embodiments of the present invention, other and further embodiments of the invention may be devised without departing from the basic scope thereof, and the scope thereof is determined by the claims that follow.

What is claimed is:

1. A method for managing message queues in a parallel computing system having a plurality of compute nodes, comprising:
   determining that a first queue, on a first compute node, of the plurality, storing a set of message descriptors has become full, wherein a direct memory access controller (DMA) is configured to inject message descriptors into the first queue, and wherein the message descriptors are received in remote get packets, each sent from a second one of the plurality of compute nodes over a point-to-point communication network connecting the plurality of compute nodes; and
   generating an interrupt delivered to an interrupt handler, wherein the interrupt handler is configured to perform the steps of:
      stopping the DMA controller;
      generating a second queue, wherein the second queue is larger than the first queue;
      swapping the first queue with the second queue such that the DMA controller is configured to inject message descriptors into the second queue;
      copying the set of message descriptors from the first queue to the second queue; and
      restarting the DMA controller.

2. The method of claim 1, further comprising, freeing memory allocated to the first queue.

3. The method of claim 1, wherein the message descriptors identify a location and a size of data requested to be sent from the first compute node to the second compute node.

4. The method of claim 3, wherein the DMA controller is configured to perform the steps of:
   retrieving a message descriptor from the second queue;
   retrieving the data at the location identified in the retrieved message descriptor; and
   transmitting the data to the second compute node.

5. The method of claim 1, wherein the remote get packet identifies a message descriptor to be injected into the first queue.

6. The method of claim 1, further comprising, after restarting the DMA controller:
   receiving, from a second compute node, a remote get packet which includes a message descriptor to be injected into the first queue; and
   injecting the message descriptor into the first queue.

7. The method of claim 1, wherein generating a second queue comprises enlarging a memory region allocated to the first queue.

8. A non-transitory computer-readable medium containing a program which, when executed, performs an operation for managing message queues in a parallel computing system having a plurality of compute nodes, the operation comprising:
   determining that a first queue, on a first one of the plurality of compute nodes, storing a set of message descriptors has become full, wherein a direct memory access controller (DMA) is configured to inject message descriptors into the first queue, and wherein the message descriptors are received in remote get packets, each sent from a second one of the plurality of compute nodes over a point-to-point communication network connecting the plurality of compute nodes; and
   generating an interrupt delivered to an interrupt handler, wherein the interrupt handler is configured to perform the steps of:
      stopping the DMA controller;
      generating a second queue, wherein the second queue is larger than the first queue;
      swapping the first queue with the second queue such that the DMA controller is configured to inject message descriptors into the second queue;
      copying the set of message descriptors from the first queue to the second queue; and
      restarting the DMA controller.

9. The computer-readable storage-medium of claim 8, wherein the interrupt handler is further configured to free memory allocated to the first queue.

10. The computer-readable storage-medium of claim 8, wherein the message descriptors identify a location and a size of data requested to be sent from the first compute node to the second compute node.

11. The computer-readable storage-medium of claim 10, wherein the DMA controller is configured to perform the steps of:
    retrieving a message descriptor from the second queue;
    retrieving the data at the location identified in the retrieved message descriptor; and
    transmitting the data to the second compute node.

12. The computer-readable storage-medium of claim 10, wherein the remote get packet identifies a message descriptor to be injected into the first queue.

13. The computer-readable storage-medium of claim 8, wherein the operation further comprises:
    after restarting the DMA controller, receiving, from a second compute node, a remote get packet which includes a message descriptor to be injected into the first queue; and
    injecting the message descriptor into the first queue.

14. The computer-readable storage-medium of claim 8, wherein generating a second queue comprises enlarging a memory region allocated to the first queue.

15. A parallel computing system, comprising:
   a plurality of compute nodes, each having at least a processor, a memory and a direct memory access controller (DMA), wherein the plurality of compute nodes are configured to move messages between compute nodes of the plurality, and wherein the DMA on a first compute node is configured to:
      determine that a first queue, on the first compute node, storing a set of message descriptors has become full, wherein the message descriptors are received in remote get packets, each sent from a second one of the plurality of compute nodes over a point-to-point communication network connecting the plurality of compute nodes, and
      generate an interrupt delivered to an interrupt handler on the first compute node, wherein the interrupt handler is configured to perform the steps of:
         stopping the DMA controller;
         generating a second queue, wherein the second queue is larger than the first queue;
         swapping the first queue with the second queue such that the DMA controller is configured to inject message descriptors into the second queue;
         copying the set of message descriptors from the first queue to the second queue; and
         restarting the DMA controller.

16. The parallel computing system of claim 15, wherein the interrupt handler is further configured to free memory allocated to the first queue.

17. The parallel computing system of claim 15, wherein the message descriptors identify a location and a size of data requested to be sent from the first compute node to the second compute node.

18. The parallel computing system of claim 17, wherein the DMA controller is configured to perform the steps of:
  retrieving a message descriptor from the second queue;
  retrieving the data at the location identified in the retrieved message descriptor; and
  transmitting the data to the second compute node.

19. The parallel computing system of claim 15, wherein the remote get packet identifies a message descriptor to be injected into the first queue.

* * * * *